United States Patent [19]

Trevijano

[11] Patent Number: 5,126,735
[45] Date of Patent: Jun. 30, 1992

[54] INTER-VEHICLE COMMUNICATION APPARATUS BY MEANS OF INFRARED RAYS USED TO REDUCE ACOUSTIC NOISE POLLUTION

[76] Inventor: Jose J. A. Trevijano, Ma Teresa Gil de Garaete No 39 - 30D, 26002 - Logrono, La Rioja, Spain

[21] Appl. No.: 666,633

[22] Filed: Mar. 8, 1991

[30] Foreign Application Priority Data

Mar. 9, 1990 [ES] Spain .................... 9000720

[51] Int. Cl.$^5$ ............................. G08G 1/00
[52] U.S. Cl. .................. 340/902; 340/901; 455/89
[58] Field of Search ........... 340/902, 903, 435, 436, 340/901, 438; 307/10.1; 455/89, 99, 345

[56] References Cited

U.S. PATENT DOCUMENTS 4,706,086 11/1987 Panizza .................. 340/902

OTHER PUBLICATIONS

"Want to Pass? Blow Your Radio", *The Washington Daily News*, Feb. 11, 1972, p. 53.

*Primary Examiner*—Jin F. Ng
*Assistant Examiner*—Jeffery A. Hofsass
*Attorney, Agent, or Firm*—Leydig, Voit & Mayer

[57] ABSTRACT

Inter-vehicle communication apparatus employing infrared beams. Two emitter-receiver (ER) devices are provided to be mounted on each vehicle. Each ER has codifier and a decoder. On a first vehicle the codifier is operated responsive to the actuation of a horn button to provide a coded signal which is emitted as a forward warning beam by the emitter section of the one ER which is mounted on the front of the first vehicle. One ER is mounted on the rear of the second vehicle which also is provided with a codifier and decoder, and a sensor for receiving a forward warning beam emitted from the one ER of the first vehicle. When a warning beam is received by the sensor of the second vehicle, it is decoded by the associated decoder and actuates an acoustic warning device within the second vehicle to warn the driver. The warning beam received by the rear-mounted ER of the second vehicle is also used to produce an acknowledgement signal which is emitted as a backward beam toward the first vehicle. The front-mounted ER of the first vehicle is also provided with a sensor to receive the acknowledgement beam which, when received within a predetermined time, prevents the horn of the first vehicle from being operated. Preferably, the ER devices are implemented with diode emitters and photo-diode sensors and associated circuits receivers.

9 Claims, 3 Drawing Sheets

INTER-VEHICLE COMMUNICATION APPARATUS BY MEANS OF INFRARED RAYS USED TO REDUCE ACOUSTIC NOISE POLLUTION

This invention concerns an inter-vehicle communication apparatus employing infrared rays. It consists of two emitter-receiver (ER) devices fitted to each vehicle in such a way that a first vehicle traveling behind a second vehicle emits a forward beam of coded infrared rays which is picked up by the second vehicle and converted into a warning signal. A return beam is generated by the second vehicle confirming or acknowledging reception of the forward beam in order to determine whether or not the vehicle horn is to be used.

One of the greatest scourges of the modern world is ambient noise, which has reached levels that are truly dangerous, having an adverse effect on work conditions, reducing the quality of life and causing illnesses among people.

The systems that are being implemented to tackle this problem do not seem to be sufficient, given that other new noise sources of a different nature are continually arising. This implies that the systems being put into practice really do have to be effective and cut out the most frequent and damaging sources of noise.

One of the main focal points of ambient noise is vehicles, with our roads having to support more and more vehicles which are increasingly powerfully equipped. Unfortunately, people themselves by their own sheer willpower are, in many cases, unable to prevent the acoustic pollution created by vehicles. So what is needed is a totally automatic system of making it impossible for this pollution to be generated. Technology itself, which is the source of the noise, can and should prevent it. There are many means available today for doing this, means that have a high capability with none of them being expensive—electronic equipment for example.

The aim of the invention—an aim that it achieves with the apparatus described—is to reduce and, with sufficiently extensive application, eliminate acoustic pollution created by vehicle horns.

The apparatus can be fitted to all vehicles and consists of two emitter-receiver ER units and associated circuitry located in each vehicle.

A front-mounted ER on a first vehicle emits infrared rays in a coded forward warning beam which is detected by an infrared-sensing unit of a rear-mounted ER on a second vehicle in front. The front-mounted ER also receives an acknowledgement signal from the rear-mounted ER of a second vehicle of the receipt of the coded forward warning beam.

The rays emitted must be such that they cannot be affected either by ambient sunlight or by lights from vehicles themselves. For this reason, the rays are coded.

When the driver of the first vehicle which is behind wants to warn the second vehicle which is in front, he presses a push-button such as the standard horn-button but, instead of the horn being operated, this action puts the infrared emitter of the front-mounted ER into operation. At that moment, two things may happen, depending on whether not the vehicle in front is fitted at a rear portion of the vehicle with the ER apparatus. If it does have the rear-mounted ER apparatus, an infrared ray sensor associated with the receiver section of the ER of the second vehicle is actuated and decodes the received signal, which triggers an acoustic warning inside the vehicle—the sound of this warning is not transmitted outside the vehicle. At the same time, the emitter section of the rear-mounted ER generates a signal confirming that the vehicle in front is fitted with this apparatus which is received and used for preventing the horn of the vehicle behind from sounding. Thus, acoustic pollution is cut out while at the same time the vehicle in front is warned.

In the second case, where the vehicle in front does not have the apparatus of this invention no confirmation signal is emitted and the vehicle horn is automatically operated—this occurs after an extremely short predetermined time interval. This manner of operating does not oppose the fight against pollution—on the contrary it allows the system to be compatible with the conventional method of warning by means of the horn. The use of the horn will be reduced as increasing numbers of apparatus are fitted.

If wished, an LED can be fitted to the emitter section of the front-mounted ER to indicate which is going to operate: the horn or the warning beam, depending on the vehicle that happens to be in front. This is useful if the driver wishes to warn a vehicle that is to the side of his own vehicle since the apparatus can be provided with a push-button to operate the horn directly. In this case, the horn will be fitted with a timer so that the acoustic signal lasts for a minimal period.

To allow the apparatus to be used even in cases where there is no-one inside the vehicle that is to be warned, as with badly parked vehicles, the signal received by a non-occupied vehicle can still be confirmed in order to prevent the horn from coming into operation. Furthermore, in these cases, according to an embodiment of the invention, the received signal causes a radio signal to be transmitted to the user of the badly parked vehicle, alerting the user to the fact that his vehicle is obstructing the normal flow of traffic.

All too often vehicles are left for a few minutes in places that impede the flow of traffic, so that the driver of a vehicle which is affected blows his horn persistently and continuously, creating an ambient noise even worse than the problems of slow traffic flow. This occurs when vehicles are double- or triple- parked, or badly parked in general.

As well as preventing acoustic ambient pollution, the invention helps the driver who leaves his vehicle badly parked because of emergency reasons to be constantly informed about his vehicle. Problems created for other traffic by bad parking will therefore be reduced, helping to keep the traffic flowing smoothly.

This is achieved by fitting the vehicle with a rear receiver (although it may be fitted to the side despite its name) as well as the devices described above, and also a low-power radioelectric transmitter suitably modulated and able to identify the vehicle. The radioelectric transmitter is connected to the vehicle's infrared ray sensor in such a way that it is actuated as soon as this sensor picks up the warning beam in the vehicle being signalled.

The radioelectric signal is short range, in practice equivalent to the acoustic range of a good horn, and is picked up by a miniature radio receiver carried around by the user whenever he leaves the vehicle. The radio signal is modulated in such a way that there is no interference from other users, and it can consist of coded pulses which allow a high number of different codings to be used. When the corresponding coded signal is received, a small acoustic warning device is set off, telling the user that his vehicle is obstructing another driver.

The different possible arrangements for the warning emitter are as follows:

a) Miniature format portable infrared emitter with coded signal.
b) Portable infrared emitter built-in to a miniature format housing along with the warning receiver.
c) Emitter located forward of the communication equipment indicated above. In the event of traffic obstruction to the side (double parking), it becomes more difficult for the original rear receiver to pick up the signal, so that emitters a and b are, in practice, more useful.

Rear receiver pick-ups are also fitted to the vehicle's rear wings, so that they can more easily receive signals from the obstructed vehicle. There are various possibilities for positioning them since this depends on the body-shape of the vehicle, though the essential characteristics of the invention are unchanged.

In order to better understand the invention, a detailed description is given below with reference to the attached drawings, wherein:

FIG. 1 shows diagrammatically of the apparatus according to the invention. There are many ways for carrying out the internal design of the units of the apparatus. All use electronic circuitry commonly found on the market and have no special peculiarities;

Figure 1:
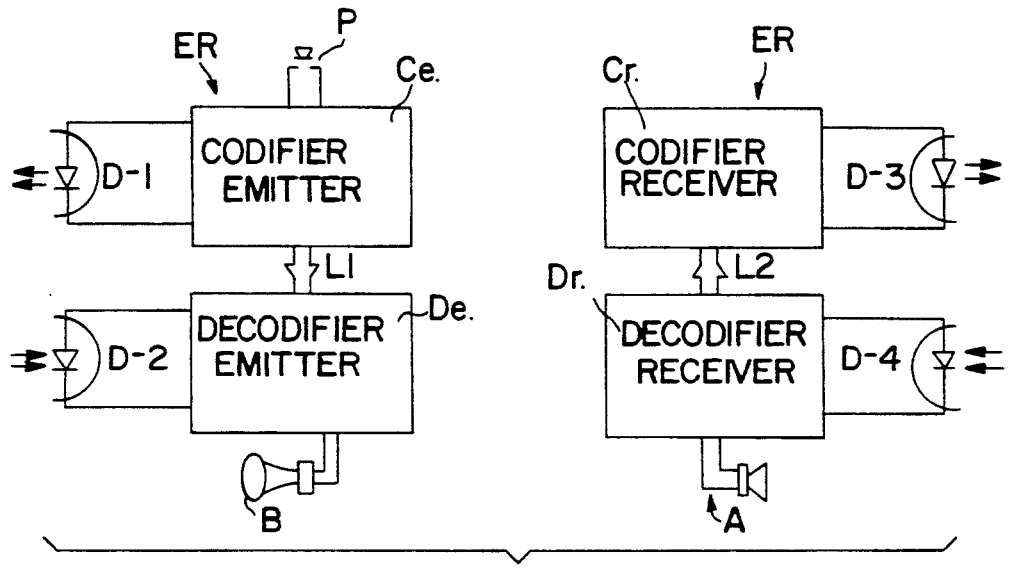
Figure 2:
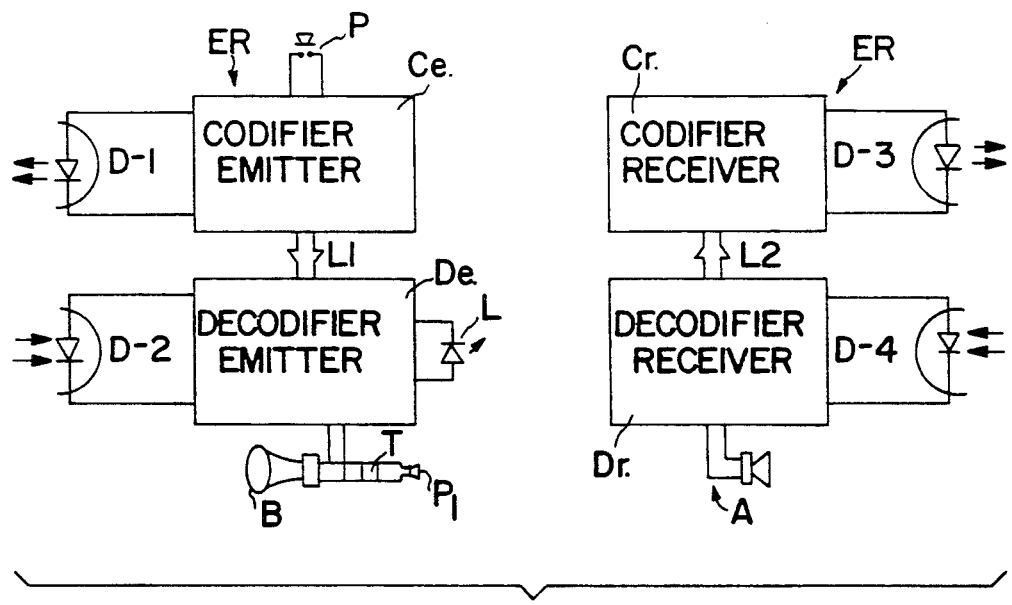
FIG. 2 is similar to FIG. 1, but with extra elements having been added so that communication is possible with vehicles not in front of the emitting vehicle.

Referring to FIGS. 1 and 2, it can be seen that an inter-vehicle communication apparatus by infrared rays consists of two emitter-receiver (ER) units, each of which has an emitter diode D-1, D-3 of the electroluminescent type with radiation in the infrared spectrum. When front-mounted on a first vehicle, the emitter diode is electrically excited by the codifier Ce, which is in turn actuated responsive to the operation of the horn-button of the first vehicle, represented by P after a predetermined time following the operation of the horn-button. A signal representing operation of the horn-button is sent to the receiver decodifier De via the connection loop L1. This decodifier De receives a confirmation or acknowledgement signal from a second vehicle which is in front of the first vehicle via the photodiode D-2, providing a sensor which detects infrared rays. The first vehicle horn B will be operated when the confirmation or acknowledgement signal is not received in the decoder De during the predetermined time, which is fixed by timing circuits of the decoder De and/or codifier Ce.

It is preferred to mount two ER units on each vehicle, one ER on the front of each vehicle to emit a forward warning beam and to receive a rearward acknowledgement beam, and one ER on the rear of each vehicle to receive a forward warning beam and to emit a rearward acknowledgement beam.

Referring to FIGS. 1 and 2, with an ER photo-diode D-4 located on the rear of a vehicle, the received signal is decoded by a decoder or decodifier Dr. This will actuate an acoustic warning device A in the vehicle interior, thereby warning the driver. At the same time, the communication loop L2 will actuate the codifier Cr which will excite the emitter diode D-3 which, in turn, will confirm to the vehicle behind that the warning has been received by emitting a backward beam representing an acknowledgment signal. The receipt of the confirmation or acknowledgement signal within the predetermined time will then prevent the horn of the vehicle behind from being operated, thereby helping to prevent acoustic ambient pollution.

In FIG. 2, it can be seen that an optical warning indicator such as and LED is provided to indicate whether or not the vehicle being warned is fitted with an inter-vehicle communication device according to the invention. This optical warning indicator also indicates whether the horn or the infrared emitter will be actuated when the push-button P is pressed. If the indicator L shows that the infrared emitter is going to be used and it is wished to use the horn to give a warning, an auxiliary push-button P-1 is provided for this purpose. This push-button P-1 is fitted with a timer T to limit the horn's operating period.

Figure 3:
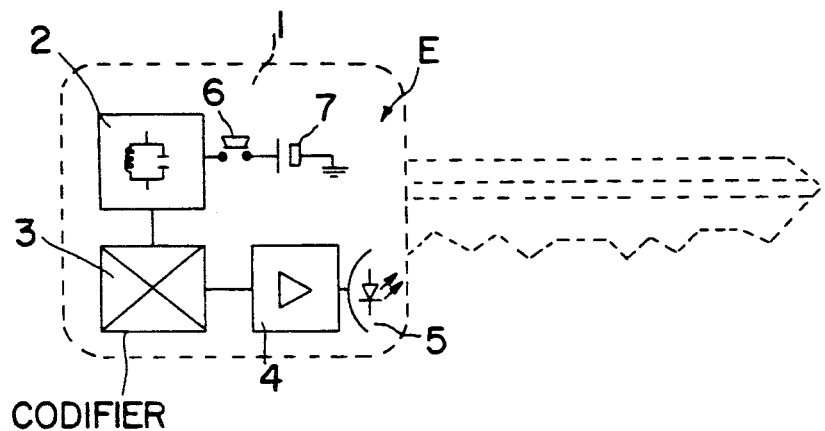
FIG. 3 shows an additional infrared emitter allowing signals to be emitted from outside the vehicle.

In FIG. 3, the apparatus includes an additional infrared emitter E in the vehicle, which is called a rear emitter even though it may be operative to transmit a warning beam to the side of a first vehicle so that vehicles on either side can be communicated with. An example of where this would be desireable is when the driver is boxed in by a double-parked vehicle. As can be seen from the diagram, the emitter E can be housed in a portion of the ignition key and consists of a generator-oscillator 2, a codifier 3 and an amplifier 4, which excites a diode 5. The supply is via a push-button 6 by means of a cell 7.

Figure 4:
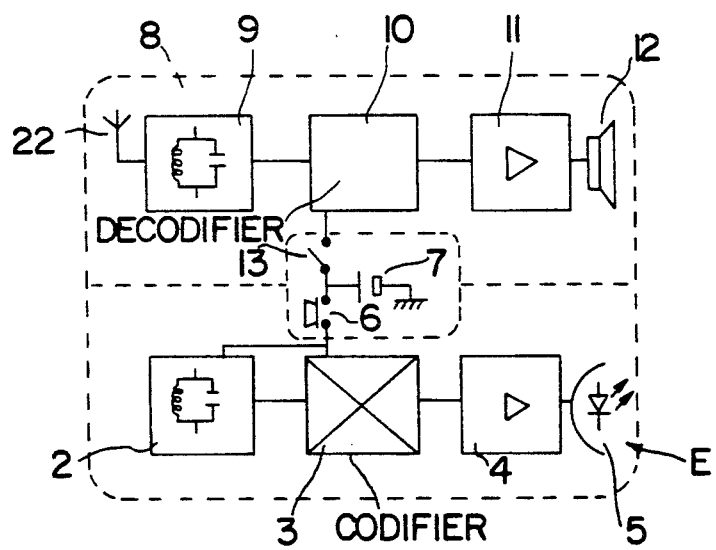
FIG. 4 shows an infrared warning emitter and radioelectric receiver fitted inside a miniature portable housing so that signals can be emitted and received either inside or outside the vehicle.

FIG. 4 shows an infrared warning emitter 5 and a radioelectric receiver located inside a miniature portable housing 8. As with the above case, the emitter consists of an oscillator 2, a codifier 3 and an amplifier 4, which excites an emitter photo-diode 5. The radioelectric receiver, for its part, consists of the antenna 22, radioelectric receiver itself 9, a decodifier 10, a power amplifier 11 and an acoustic warning device 12. Both the emitter and the radioelectric receiver are supplied by a cell 7, the former via a push-button 6 and the latter via a switch 13.

Figure 5:
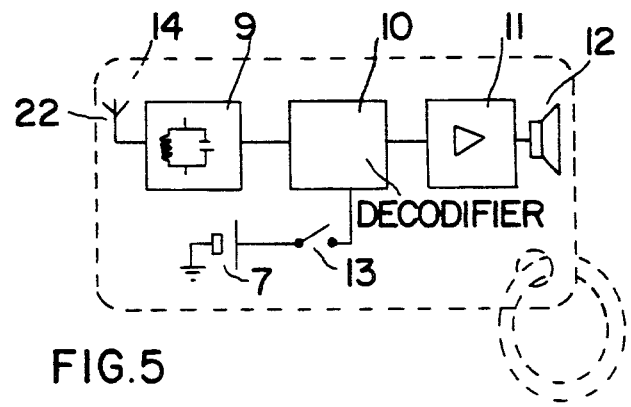
FIG. 5 shows a miniature radioelectric receiver that can pick up signals reaching the vehicle when one is outside the vehicle.
Figure 6:
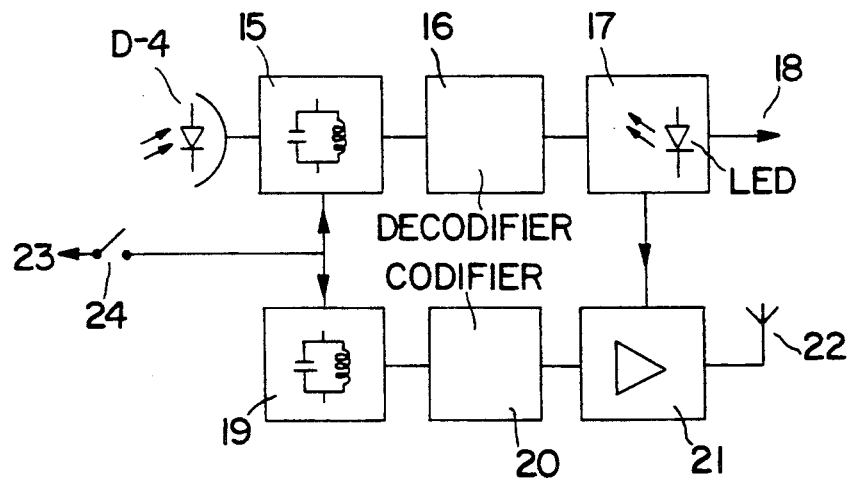
FIG. 6 shows an infrared receiver unit to which the radioelectric transmitter has been added.

FIG. 5 shows a radioelectric receiver in a housing 14 in the form of a key-ring, each constituent part being designated with the same references as those used for FIG. 4, and to be carried by a driver after leaving a parked vehicle to receive a radio warning signal retransmitted from the parked vehicle, as by the unit of FIG. 6.

Finally, FIG. 6 includes an infrared sensor D-4 located in the rear and/or side of the vehicle. This receives an infrared warning signal, which is filtered and amplified in the receiver 15. It is then decoded in the decodifier 16 and displayed in a display unit 17 by an LED diode, at the same time as the acknowledgement signal is emitted by a coder and emitter connected to the terminal 18 to silence the horn of a following vehicle. Also provided is a radioelectric transmitter which includes an oscillator 19, a codifier 20, an amplifier 21 and an antenna 22. The whole unit is supplied from the vehicle battery via a switch 24.

I claim:

1. An apparatus for inter-vehicle communication by infrared ray beams comprising:
    a first infrared ray beam emitter-receiver (ER) front-mounted on a first vehicle;
    a second ER on a second vehicle;
    a first infrared ray beam sensor included in the ER on the second vehicle to detect a coded warning signal emitted as a forward beam by the first ER on the first vehicle;
    a second infrared ray beam sensor included in the ER on the first vehicle to detect a coded acknowledgement signal emitted as a backward beam by the second ER on the second vehicle;
    a horn on the first vehicle having a horn-button;
    circuit means for actuating the horn, responsive to operation of the horn-button, after a predetermined time, and for actuating the first ER, said circuit means including a codifier so that the first ER produces a coded warning signal;
    an acoustic warning device on the second vehicle and a decoder which decodes the warning signal detected by the first sensor and provides an actuating signal which actuates the acoustic warning device of the second vehicle thereby warning an occupant of the presence of the first vehicle;
    a codifier which also receives an actuating signal from the decoder and actuates the second ER to emit a coded acknowledgement signal in a backward beam; and
    a decoder on the first vehicle which decodes the acknowledgement signal when detected by the second sensor on the first vehicle during the predetermined time and provides a signal which prevents the circuit means from operating the horn responsive to the operation of the horn-button.

2. Apparatus according to claim 1 further including an auxiliary push-button means including a timer for operating the first ER to emit a warning signal to vehicles other than a second vehicle, and an optical warning device indicating that the push-button means has been operated.

3. Apparatus according to claim 1 further including a radioelectric transmitter which emits a coded radio signal responsive to a warning signal being detected by the first sensor on the second vehicle, and a portable radioelectric receiver which receives the coded radio signal, the portable receiver having means for actuating a sound alarm for warning a carrier of the portable receiver.

4. Apparatus according to claim 1 wherein the second vehicle is provided with a plurality of infrared ray beam receivers and associated acoustic warning devices, to receive warning signals from different directions and to actuate the respective acoustic warning devices responsive to the receipt of such warning signals.

5. Apparatus according to claim 1 including a portable unit on the first vehicle having an infrared ray beam emitter, the emitter of the portable unit generating a warning signal which is transmitted in a sidewise direction of the first vehicle.

6. Apparatus according to claim 5, wherein said portable unit is housed in a portion of a vehicle ignition key.

7. Apparatus according to claim 3 wherein an infrared ray beam emitter and the radioelectric transmitter are mounted within a common portable housing.

8. Apparatus according to claim 1 wherein the sensors comprise photo-diodes and associated circuits.

9. Apparatus according to claim 1 wherein at least one of the first and second vehicles includes both a front dash mounted ER and a rear dash mounted ER.

* * * * *